(12) United States Patent
Lardillon

(10) Patent No.: US 7,532,970 B1
(45) Date of Patent: May 12, 2009

(54) METHOD OF OPTIMIZING THE PERFORMANCE ENVELOPE OF A TURBINE ENGINE

(75) Inventor: Christian Lardillon, Aix En Provence (FR)

(73) Assignee: Eurocopter, Marignane (FR)

( * ) Notice: Subject to any disclaimer, the term of this patent is extended or adjusted under 35 U.S.C. 154(b) by 523 days.

(21) Appl. No.: 11/481,081

(22) Filed: Jul. 6, 2006

(30) Foreign Application Priority Data

Jul. 7, 2005 (FR) .................................. 05 07265

(51) Int. Cl.
*F02C 9/28* (2006.01)
*G05D 1/08* (2006.01)
*G06F 17/00* (2006.01)

(52) U.S. Cl. .............................. 701/100; 701/1; 701/34; 702/182

(58) Field of Classification Search ................ 701/100, 701/1, 29, 34, 35; 702/182, 189, 34; 244/102 R, 244/105, 17.13; 60/39.6, 737, 39.181, 605.1
See application file for complete search history.

(56) References Cited

U.S. PATENT DOCUMENTS

| | | | | |
|---|---|---|---|---|
| 4,271,664 A | * | 6/1981 | Earnest .................... | 60/39.181 |
| 5,873,546 A | * | 2/1999 | Evans et al. ............... | 244/17.13 |
| 6,925,809 B2 | * | 8/2005 | Mowill ........................ | 60/737 |
| 2004/0020214 A1 | | 2/2004 | Pisano et al. | |
| 2007/0051087 A1 | * | 3/2007 | Rom et al. ................... | 60/39.6 |

FOREIGN PATENT DOCUMENTS

| | | |
|---|---|---|
| EP | 1 408 214 A | 4/2004 |
| FR | 1 388 235 A | 2/1965 |
| FR | 2 602 270 A | 2/1988 |

\* cited by examiner

*Primary Examiner*—Tan Q Nguyen
(74) *Attorney, Agent, or Firm*—Young & Thompson

(57) ABSTRACT

A method of optimizing an initial performance envelope of a rotorcraft turbine engine, the initial envelope being associated with a maximum number of flying hours that the turbine engine can perform before being overhauled, and also with at least a first initial rating defined by two first initial performance levels relating respectively to a first power and to a first utilization time of the first power. The method is remarkable in that in order to perform the optimization, an alternative performance envelope is defined by modifying the initial envelope, the modification being compensated by reducing at least one of the first initial performance levels of the first initial rating. In addition, the overall service life of the turbine engine is not modified insofar as the alternative envelope is associated with the maximum number of flying hours authorized for operating the turbine engine in compliance with the initial envelope.

5 Claims, 1 Drawing Sheet

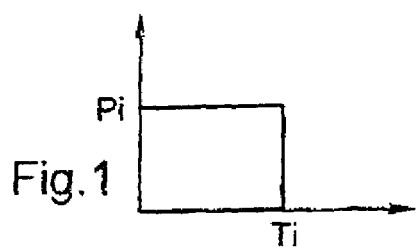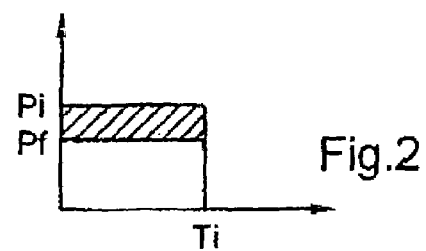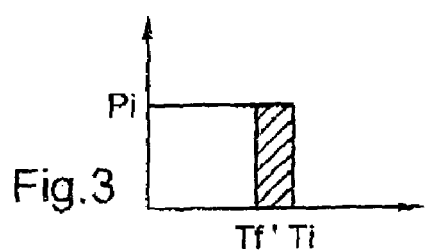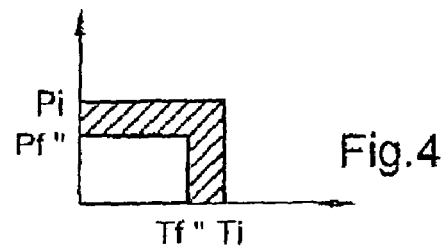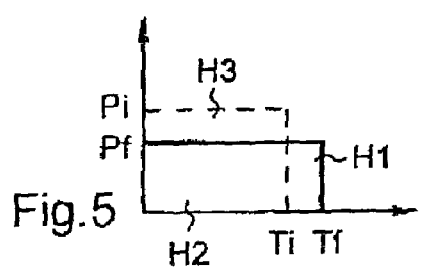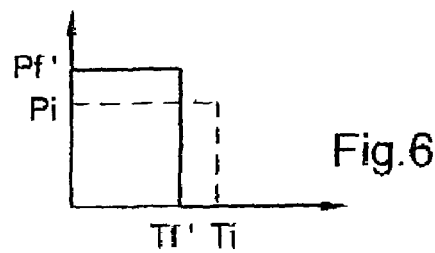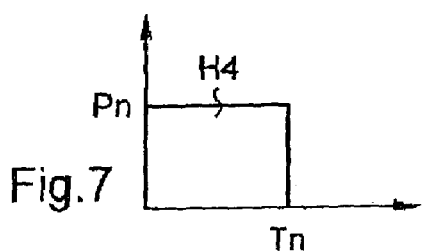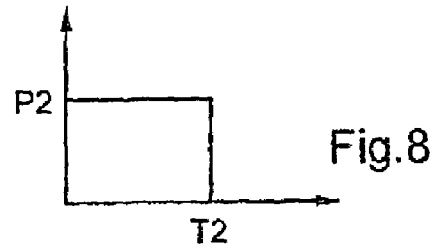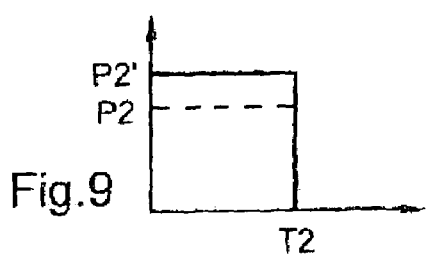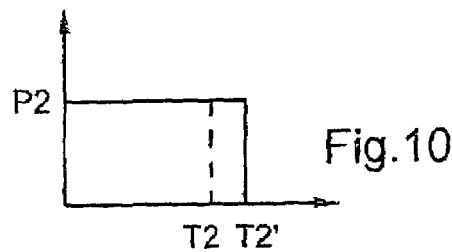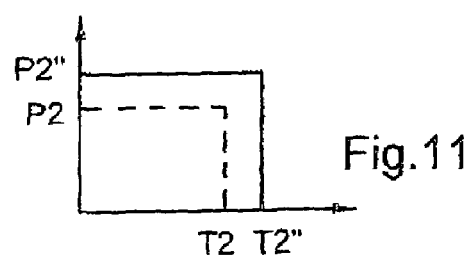

METHOD OF OPTIMIZING THE PERFORMANCE ENVELOPE OF A TURBINE ENGINE

The present invention relates to a method of optimizing the performance envelope of a rotorcraft turbine engine enabling the turbine engine to be used in an alternative envelope of performance that is different from the envelope of performance that was initially authorized for the turbine engine.

BACKGROUND OF THE INVENTION

Most presently-constructed rotorcraft are fitted with one or two free-turbine engines. Power is then taken from a low-pressure stage of the free turbine, which stage is mechanically independent from the compressor assembly and the high-pressure stage of the turbine engine. The free turbine of a turbine engine generally revolves at 20,000 revolutions per minute (rpm) to 50,000 rpm, so it is necessary to have a speed reduction gearbox in the connection with the main rotor of the rotorcraft since its speed of rotation lies substantially in the range 200 rpm to 400 rpm: this is the main transmission gearbox.

The thermal limitations of a turbine engine, and the torque limitations of a main transmission gearbox serve to define a performance envelope covering two normal operational ratings for use of a turbine engine fitted to a rotorcraft having one or two engines:

- take-off rating corresponding to a level of torque for the transmission gearbox and a level of heating for the turbine engine that can be accepted for a limited length of time without significant degradation: this is maximum take-off power (PMD) and it can be used for five minutes;
- maximum continuous rating during which the capabilities of the transmission gearbox and the capabilities that result from maximum acceptable continuous heating in front of the high pressure blades of the first state of the turbine are not exceeded at any time: this is maximum continuous power (PMC), it can be used without any time limit, and it corresponds to about 90% of PMD.

On a two-engine rotorcraft, the performance envelope also covers emergency supercontingency ratings, that are used only in the event of one engine being inoperative (OEI):

- the supercontingency rating during which the capabilities of the transmission gearbox on the inlet stages and the thermal capabilities of the turbine engine are used to the maximum: this is referred to as super-emergency power (PSU) equal to about 112% to 120% of PMD and it can be used for a maximum of thirty consecutive seconds, and only three times in any one flight, and if ever PSU is used, it is then necessary to remove and overhaul the turbine engine;
- a supercontingency rating during which the capabilities of the transmission gearbox on the inlet stages and the capabilities of the turbine engine are used to a very great extent: the power level is then about 105% to 110% of PMD and this level can be used for a maximum of two consecutive minutes, being known as maximum emergency power (PMU); and
- the supercontingency rating during which the capabilities of the transmission gearbox on the inlet stages and the thermal capabilities of the turbine engine are used without damage: this level is equal to PMD and can be used continuously for the remainder of a flight after a turbine engine has failed, and is referred to as intermdediate emergency power (PIU).

Consequently, the thermal and mechanical constraints and also the phenomenon of turbine blade creep lead to the turbine engine being degraded to a greater or lesser extent depending on the rating used. To guarantee safety in flight and to guarantee that performance is achieved, it is therefore essential to determine the maximum amount of damage that a turbine engine can accept.

Thereafter the overall utilization potential of the turbine engine is evaluated. Concretely this reduces to defining a maximum number of flying hours, known as time between overhauls (TBO), that the turbine engine is capable of performing since its most recent overhaul or since its first use, depending on current circumstances. Once this TBO has been reached, the turbine engine is removed and then overhauled.

Below in this text, and for convenience, the term "most recent overhaul of the turbine engine" is used to cover either the first use of the turbine engine or indeed the most recent overhaul thereof.

Furthermore, in order for a rotorcraft to obtain authorization to fly in a determined country, it is required that the performance envelope and the TBO of the turbine engine(s) of the rotorcraft be certified by the official services of the country in question for a precise utilization spectrum. Such authorization can thus be obtained only after complete certification tests, and they are very expensive.

These complete certification tests of a turbine engine are performed in order to justify a performance envelope associated with a TBO, so, a priori, it is not possible to use that turbine engine with an alternative performance envelope, different from the performance envelope that was initially authorized, without performing new complete certification testing, which is very expensive.

It can happen, for example, that the above-described performance envelope associated with a TBO of about 2500 hours (h) corresponds to a utilization spectrum of a type that complies with most civilian applications. Nevertheless, for a military application or for certain special missions, e.g. a rescue mission requiring winching, that envelope can turn out to be unsuitable.

OBJECTS AND SUMMARY OF THE INVENTION

In order to remedy the problem, one solution would be to produce, for an existing rotorcraft, turbine engines that are dedicated to specific applications. Nevertheless, given the costs of development, of certification, and of integration, that solution can seen as being unsatisfactory. Long production runs would be needed in order to pay back adequately the investment made. That goes against the desired principle, whereby a specific turbine engine is used having alternative performance on an existing rotorcraft in order to satisfy a particular requirement, which implies short production runs.

Under such conditions, an object of the present invention is to provide a method of optimizing the initial performance envelope, i.e. the envelope initially authorized for an existing rotorcraft turbine engine, while performing complementary tests only and not complete testing.

For specific applications, it then becomes possible on an existing rotorcraft to use a turbine engine that was not initially designed for that purpose. Thus, a helicopter manufacturer can save on the very large costs of developing a new turbine engine by increasing the capabilities of an engine that has already been certified and tested, e.g. in civilian use.

According to the invention, a method for doing an optimization of an initial envelope of performance of a rotorcraft turbine engine, said initial envelope being associated with a maximum number of flying hours TBO that said turbine engine can perform before being overhauled, and also with at least a first initial rating defined by two first initial performance levels relating respectively to a first power and to a first utilization time for said first power, is remarkable in that in order to perform said optimization, an alternative envelope of performance is defined by doing a modification of said initial envelope, said modification being compensated by reducing at least one of said first initial performance levels of said first initial rating. Furthermore, the overall service life of the turbine engine is not modified insofar as the alternative envelope is associated with said maximum number of flying hours TBO authorized for operating the turbine engine in compliance with said initial envelope.

Thus, a performance envelope is associated with a maximum number of flying hours and with at least one operational rating, said rating corresponding to a power usable during a determined length of time. The present invention serves to determine an alternative performance envelope that does indeed differ from the initial envelope of the turbine engine.

To do this, the initial envelope is modified by reducing the power of an initial envelope rating and/or the utilization duration at said power. Thereafter, the following steps are performed:

a) determining the amount of damage saved by said reduction;

b) transforming said amount of damage into a temporary rating defined by a temporary power and a temporary utilization time for said temporary power; and c) distributing said temporary rating differently within said initial envelope so as to obtain said alternative envelope.

It will readily be understood that reducing the performance, the power, and/or the utilization time of a rating has the consequence of the turbine engine being degraded to a smaller extent. The invention sets out to optimize the initial envelope while conserving the authorized maximum number of flying hours, thereby making it possible to avoid undertaking expensive testing.

Consequently, during step a), the amount of damage saved by reducing one of the first performance levels of at least one initial rating is determined. This damage saving corresponds to the wear that the turbine engine would have suffered if the above-mentioned reduction had not occurred.

Thereafter, during step b), a temporary rating is determined that is appropriate for the desired need, and for which use of that rating would lead to turbine engine damage equivalent to the amount of damage saved.

Finally, it is appropriate to reinject the temporary rating into the initial envelope in order to modify the initial envelope and thus obtain the alternative envelope.

In a first implementation, the modification consists in increasing one of said two first initial performance levels while reducing the other.

In a second implementation, the alternative envelope includes an additional rating that is not included in the initial envelope. The modification then consists in determining the additional rating by reducing at least one of said two initial performance levels of said first initial rating. The additional rating corresponds to the temporary rating.

In a third implementation, for an initial envelope including a second initial rating defined by two second initial performance levels relating respectively to a second power and to a second utilization time for the second power, the modification consists in increasing at least one of the two second initial performance levels of the second rating while reducing at least one of the two first initial performance levels of the first rating.

BRIEF DESCRIPTION OF THE DRAWINGS

The invention and its advantages appear in greater detail in the following description relating to a preferred implementation that is given without any limiting character and with reference to the accompanying figures, in which:

FIG. 1 is a diagram showing the first initial rating;

FIGS. 2 to 4 are diagrams showing a reduction in at least one of two first performance levels of the first initial rating;

FIGS. 5 and 6 are diagrams showing variation in the first initial rating in a first implementation;

FIG. 7 is a diagram showing the additional rating; and

FIGS. 8 to 11 are diagrams showing variation in the second initial rating in a third implementation.

MORE DETAILED DESCRIPTION

The elements shown in two or more distinct figures are given the same references in each of them.

FIGS. 1 to 11 are diagrams plotting the power developed by the turbine machine up the ordinate and plotting the time for which this power is used along the abscissa.

FIG. 1 shows a first initial rating of the initial envelope of performance authorized for a given turbine engine. This first rating is defined by two first initial performance levels relating respectively to a first power Pi and to a first utilization time Ti for the first power Pi. Thus, this first rating provides for using the turbine engine at the power Pi during at maximum the utilization time Ti.

To create an alternative envelope of performance that better satisfies a specific requirement of the user, it is necessary to do a modification of the initial envelope. This modification is compensated by reducing at least one of first two performance levels of the first rating.

Thereafter, depending on the user's requirements, the following is/are performed:

either the first power Pi is lowered to a power Pf as shown in FIG. 2;

or the first utilization time Ti is shortened to a utilization time Tf' as shown in FIG. 3;

or both the first power Pi is lowered to a power Pf" and the first utilization time Ti is shortened to a utilization time Tf" as shown in FIG. 4.

In each of FIGS. 2 to 4, the shaded area corresponds to an operating range for the turbine engine that is no longer used.

According to the invention, during a step a), the amount of damage to the turbine engine that is saved by not making use of the shaded areas is then determined. This non-use serves to preserve the turbine engine and thus limit wear therein, i.e. limit damage thereto.

Thereafter, since the object of the invention is not to limit damage to the turbine engine but to enable it to operate in an alternative envelope having the same TBO as the initial envelope, during step b), a temporary rating is determined that is defined by a temporary power and a temporary utilization time. Then during step c) the temporary rating is distributed in some different manner in order to obtain finally the alternative envelope.

With reference to FIGS. 5 and 6, in a first implementation, the alternative envelope is obtained by reducing one of the first two performance levels of the first rating of the initial envelope while increasing the other first performance level of the first rating.

In a first variant of this first implementation, when it is the power that is reduced from Pi to Pf (FIG. 2), it becomes possible to increase the utilization time from Ti to Tf as shown in FIG. 5. In this FIG. 5, the first initial rating is plotted in dashed lines, while the rating obtained by the modification is plotted in continuous lines.

The zone H1 corresponds to the temporary rating that has been added to the reduced initial rating, represented by the zone H2, while the reduction is represented by the zone H3.

In addition, given the above explanations, the zones H1 and H3 give rise to equal amounts of damage to the turbine engine. It should be observed that the areas of the zones H1 and H3 are not necessarily identical, since the amount of damage depends both on the power levels taken into consideration and on their utilization times.

Consequently, the method of the invention makes it possible to transform an initial performance envelope of a turbine engine provided with a first rating that allows using a power Pi for a time Ti into an alternative envelope that allows using a power Pf for a duration Tf, with the modification being performed without modifying the overall service life of the turbine engine.

Furthermore, in order to automate modification, it can be implemented using a first transfer relationship as follows, in which C represents a transfer coefficient defined by the engine manufacturer:

$$(Pi-Pf)*Ti=C*Pf*(Tf-Ti)$$

where "*" and "−" represent respectively multiplication and subtraction signs.

Once the transfer coefficient has been established by basic testing there is no longer any need to perform expensive full testing in order to justify the use of a new alternative envelope.

Similarly, with reference to FIG. 6, in a second variant of this implementation, it is possible to reduce the utilization time of the first initial rating while increasing the power of said rating in order to obtain an alternative envelope.

The alternative envelope then comprises an alternative rating plotted in continuous lines, allowing a power Pf' to be used for a utilization time Tf'.

Under such conditions, the transfer relationship becomes:

$$Pi*(Ti-Tf')=C*(Pf'-Pi)*Tf'$$

With reference to FIG. 7, in a second implementation, the alternative envelope includes an additional rating that does not come within the initial envelope.

By reducing at least one of the two first performance levels of the first rating of the initial envelope, it becomes possible to create a new rating that allows the turbine engine to be used at a power Pn for a utilization time Tn. The shaded zone H4 then corresponds to the temporary rating.

With reference to FIG. 8, in a third implementation, the initial envelope includes a second initial rating, defined by two second performance levels, namely a second power P2 and a utilization time T2, allowing the turbine engine to operate at a power P2 for a duration T2. By reducing at least one of the two first performance levels of the first rating corresponding to FIGS. 2 to 4, at least one of the two performance levels of the second rating are modified so as to obtain the alternative envelope.

In a first variant of this implementation, as shown in FIG. 9, only the second power is increased by going from a power P2 to a power P2'.

Thereafter, the alternative envelope is constituted, for example, by a rating allowing the turbine engine to be used at a power Pf for a time Ti (FIG. 2) and a rating allowing the turbine engine to operate at a power P2' during a time T2.

Under such circumstances, the transfer relationship is given by:

$$(Pi-Pf)*Ti=C*(P2'-P2)*T2$$

In a second variant shown in FIG. 10, only the utilization time is modified by going from a time T2 to a time T2'. Using the same assumptions as above, the transfer relationship becomes:

$$(Pi-Pf)*Ti=C*P2*(T2'-T2)$$

Finally, in a third variant of this third implementation, both second performance levels of the second initial rating are increased, power going from P2 to P2" and utilization time going from T2 to T2". Using the same assumptions as above, the transfer relationship is given by:

$$(Pi-Pf)*Ti=C*(P2"-P2)*(T2"-T2)$$

Naturally, the transfer coefficient C may have different values for each of the above-described transfer relationships.

Naturally, the present invention is capable of numerous variations as to its implementation. Although several implementations are described above, it will readily be understood that it is not conceivable to identify exhaustively all possible implementations.

For example, the implementations represented by FIGS. 5 to 6 refer to only one initial envelope that contains only one first initial rating that is modified in order to obtain the alternative envelope. Nevertheless, this initial envelope could comprise a plurality of initial ratings. Under such circumstances, a plurality of them could be modified in order to obtain the alternative envelope.

What is claimed is:

1. A method for doing an optimization of an initial envelope of performance of a rotorcraft turbine engine, said initial envelope being associated with a maximum number of flying hours (TBO) that said turbine engine can perform before being overhauled, and also with at least a first initial rating defined by two first initial performance levels relating respectively to a first power (Pi) and to a first utilization time (Ti) for said first power (Pi), wherein, in order to perform said optimization, an alternative envelope of performance is defined by doing a modification of said initial envelope, said modification being compensated by reducing at least one of said first initial performance levels of said first initial rating, said alternative envelope being associated with said maximum number of flying hours (TBO) authorized for operating the turbine engine in compliance with said initial envelope.

2. A method according to claim 1, wherein said modification consists in increasing one of said two first initial performance levels while reducing the other.

3. A method according to claim 1, wherein said alternative envelope includes an additional rating that is not provided in said initial envelope, said modification consisting in determining said additional rating by reducing at least one of said first two initial performance levels of said first initial rating.

4. A method according to claim 1, wherein, for said initial envelope including a second initial rating defined by two second initial performance levels relating respectively to a second power and to a second utilization time of said second power, said modification consists in increasing at least one of said two second initial performance levels of said second rating while reducing at least one of said two first initial performance levels of said first rating.

5. A method according to claim 1, wherein the following steps are performed:
   a) determining the amount of damage saved by said reduction;
   b) transforming said amount of damage into a temporary rating defined by a temporary power and a temporary utilization time for said temporary power; and
   c) distributing said temporary rating differently within said initial envelope so as to obtain said alternative envelope.

* * * * *